Aug. 3, 1937.        J. W. BEECHER        2,088,568
INTEGRATING ATTACHMENT FOR TELEMETRIC SYSTEMS
Filed July 1, 1936        2 Sheets-Sheet 1

INVENTOR.
J. WINFRED BEECHER
BY
ATTORNEY.

Aug. 3, 1937.  J. W. BEECHER  2,088,568
INTEGRATING ATTACHMENT FOR TELEMETRIC SYSTEMS
Filed July 1, 1936  2 Sheets-Sheet 2
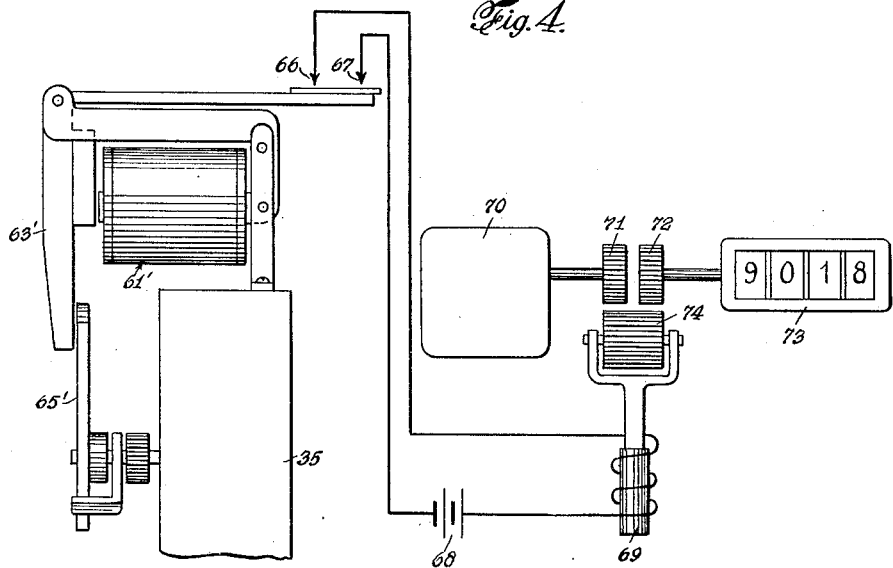
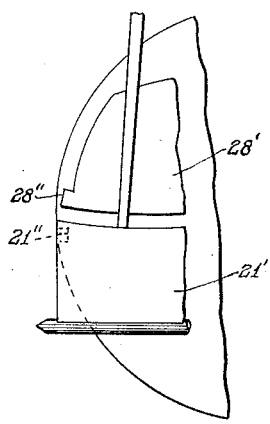
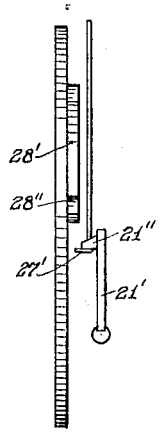
INVENTOR.
J. WINFRED BEECHER
BY
ATTORNEY.

Patented Aug. 3, 1937

2,088,568

UNITED STATES PATENT OFFICE 2,088,568

INTEGRATING ATTACHMENT FOR TELEMETRIC SYSTEMS

John Winfred Beecher, Waterbury, Conn., assignor to The Bristol Company, Waterbury, Conn., a corporation of Connecticut Application July 1, 1936, Serial No. 88,328

7 Claims. (Cl. 235—61)

This invention relates to integrating devices for flow or other more or less continuously varying magnitudes, and more particularly to integrators of the class disclosed in U. S. Letters Patent No. 1,985,130, issued December 18, 1934, to K. Wilde. In this patent there is set forth a telemetric receiver responsive to signals of time durations proportional to successive values of a quantity, said receiver comprising a motor rotatable at a substantially constant speed, and an element operated thereby, for time durations corresponding to said signals, for integrating said quantity means.

This type of telemetric receiver is particularly suited for use with telemetering systems of the "impulse" class, in which an indicating or recording pointer is positioned successively in opposite senses by respective impelling elements whose excursions are defined by the durations of impulses originating in a transmitting measuring unit. These elements are caused to act through an electro-mechanical system in such a manner that the ultimate position of the pointer is representative of the measured quantity.

The invention, as hereinafter set forth, may advantageously be utilized in combination with a receiving mechanism of the type disclosed in U. S. Letters Patent No. 2,040,913, issued May 19, 1936, to Carlton W. Bristol; and in the embodiment herein described and shown such association is set forth.

While the operation of the type of the Wilde integrator hereinbefore set forth is based on the assumption that transmitted impulses are in duration directly proportional to successive values of the measured quantity, it is sometimes found desirable in the practical embodiment of indicating and recording receivers of the class disclosed in the above-mentioned patent to Bristol, that the impulses, while varying in a manner representative of those values, be not directly proportional thereto. Such arrangement is necessitated primarily in the need for providing a positive "make" and a positive "break" to define each interval, and thus prevent stalling of the mechanism at either end of the scale, and also to differentiate between actual measuring impulses and effects developing as a consequence of trouble in the interconnecting circuit. This, and other mechanical features, the nature of which will hereinafter appear, are met in practice by the provision of an impulse-time-interval somewhat greater than that which would be truly proportional to the measured magnitude, the excess being of constant value, and represented in the receiving recorder or indicator by an interval in each impulse during which the pointer-propelling mechanism is in motion before it reaches a position corresponding to the zero position of the scale.

While errors in scale indication, due to non-agreement of impulse and scale deflection, are readily eliminated by an adjustment equivalent to a zero-setting, it will be apparent that, in those receiving units wherein an integrating mechanism of the type above set forth is activated by the received impulses including an excess effect, the advance of the integrating register will not be proportional to the summation of successive determinations of the measured quantity since such advance is proportional to the sum of the times of the impulses.

It is an object of the present invention to provide for telemetering systems of the impulse class, and wherein the durations of successive impulses are not directly proportional to successive values of the measured magnitude, an integrating attachment and transmitting mechanism whereby the non-proportionality component may be eliminated from the computation and a true summation obtained of successive values.

The nature of the invention, however, will best be understood when described in connection with the accompanying drawings, in which:

Fig. 4 is a fragmentary diagrammatic view showing an alternative method of associating the novel integrator system with the receiving element of a telemeter.

Fig. 5 is a fragmentary elevation showing a modification of the contacting structure constituting a part of the transmitter mechanism.

Fig. 6 is a side view thereof.

Figure 1:
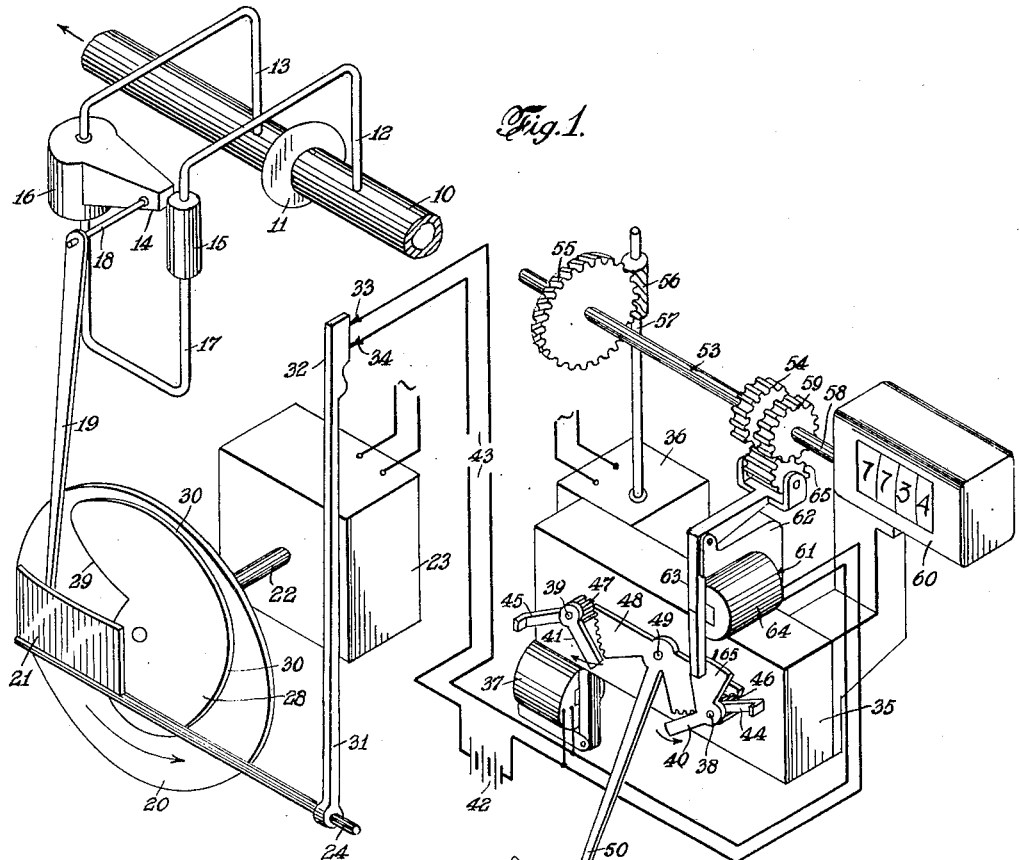
Fig. 1 is a diagrammatic view in isometric projection showing a telemetering system arranged for determination of flow in a pipe line, and embodies a preferred form of transmitting unit, and a receiving unit with which is directly associated the novel integrator system.

Referring to the drawings, and more particularly to Fig. 1, 10 indicates a pipe line through which is assumed to be passing, in the direction indicated by the arrow, a fluid the volume of whose flow it is desired to determine at a point remote from said line, and there obtain both a continuous graph of rates of flow and an integration of the total amount of fluid which has passed in a given time. Inserted in the pipe line is an orifice-plate 11, of well-known construction and whereby the passage of fluid through the same sets up a pressure differential, which, through two conduits 12 and 13 is applied to a manometer element 14 of a conventional type. The manometer 14 embodies two chambers 15 and 16 containing a heavy liquid, such as mercury, and connected by a U-tube 17, whereby the pressure-differential in the two chambers due to flow of fluid in the pipe line 10 through the orifice-plate 11 produces a difference of level in the mercury surfaces in the two chambers. A spindle 18 is actuated by the manometer and carries an arm 19 deflecting to varying extents in accordance with the response of the manometer, and its position in the plane of deflection becomes a measure of flow through the pipe line 10—all of which is well understood and forms no particular part of the present invention.

The plane of deflection of the arm 19 is between a flat circular plate 20 to the rear and a flat "anvil-plate" 21 to the front, the path of deflection of the extremity of the arm being substantially radial to the circular plate 20. The said plate 20 is carried on a centrally disposed shaft 22; and the shaft, with the plate, is continuously rotated at a uniform velocity in a counter-clockwise sense, as shown in the drawings, by a constant-speed motor 23, which may conveniently be a motor of the "Telechron" type with a suitable gear train, to give the plate 20 an augular velocity of, for example, four revolutions per minute.

Figure 2:
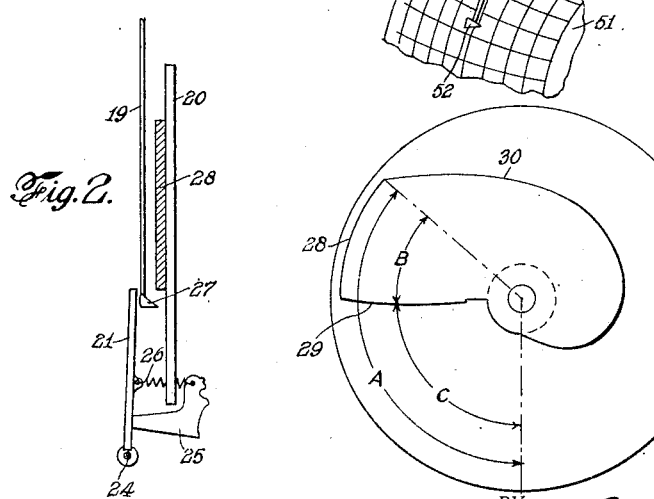
Fig. 2 is a fragmentary side view, to a somewhat enlarged scale, of a portion of the transmitting mechanism.

The anvil plate 21, as shown in Fig. 2, is fixed to an oscillatable shaft 24, free to swing through a small angle transversely of the plane of travel of the arm 19, and is normally held toward the plate 20, and against a stop 25, by a small spring 26. Carried upon the extremity of the arm 19 is a rider 27, swinging freely with the arm 19 in the space normally provided between the plates 20 and 21 when the latter is resting against the stop 25. The rider 27, on its edge radially toward the spindle 18, has an inclined surface, and on its opposed face a surface perpendicular to the plane of deflection.

Affixed to the circular plate 20, and rotating therewith, is a flat cam member 28 having a leading edge 29 and a spiral trailing edge 30. The leading edge 29 is conformed to an arc concentric with the spindle 18, so that as the cam rotates, the edge 29 will engage the rider 27 on its inclined surface, and lift it into engagement with the anvil plate 21, causing the latter to be rocked in a sense perpendicular to that of rotation of the cam, and always at the same instant in the cycle of rotation of the cam, without regard to the deflected position of the arm 19 about the axis of the spindle 18. This effects a corresponding oscillation of shaft 24. The trailing edge 30, over which the rider slips, allowing the plate 21 to be returned by the spring 26 to its normal position against the stop 25, is conformed to a spiral, the nature of which will hereinafter be set forth in fuller detail.

Attached to the shaft 24 is an arm 31, shown in Fig. 1, and carrying on its extremity a circuit-controlling element 32 normally closing an electrical circuit at two contacts 33 and 34, said element acting to open the circuit when the plate 21 is deflected by the cam member 28. Thus, as the cam member 28 is continuously rotated with the plate 20, an electric circuit will be repeatedly closed and opened in definite cycles, as determined by the speed of the motor 23, the duration of each impulse so defined being dependent upon the angle subtended by the portion of the cam 28 engaged by the rider 27.

The receiving unit, which is of the type set forth in the hereinbefore mentioned Patent No. 2,040,918, embodies two similar sets of gearing, oppositely and alternatively driven, and adapted respectively to impel an indicating or recording pointer toward one extreme or the other of a graduated scale, according to whether or not a telemetering impulse is existent in a circuit connecting with the transmitting unit. Such a mechanism is contained within the casing 35, Fig. 1.

A constant-speed motor 36, through a gear system not shown in drawings, but substantially identical with that disclosed in Patent No. 2,040,918, drives alternately and in opposite directions, according to the energization or deenergization of an electromagnet 37, a pair of parallel spindles 38 and 39, to which are affixed respectively impeller members 40 and 41, having directions of driven rotation as indicated in the drawings by the associated arrows. The magnet 37 receives energy from a battery or like source 42 through a circuit which includes the contacts 33 and 34 of the transmitter and a two-conductor connecting circuit 43.

Rotatably mounted upon the spindles 38 and 39 are lever-arms 44 and 45, having affixed thereto pinions 46 and 47, both of which mesh with a mutilated gear 48 mounted upon a frictionally retained rotatable spindle 49. This spindle carries an extended indicating or recording arm 50, which may be deflected toward one or the other end of a graduated scale. The latter, as shown in Fig. 1, takes the form of a record chart 51, driven in a conventional manner by a timing element (not shown in the drawings), whereby a marking member 52 carried on the extremity of the arm 50 may be caused to produce on the chart a permanent record of the positions of the arm.

The electrical and mechanical arrangement is such that upon the occurrence of an impulse in the connecting circuit 43, coincident with the rider 27 of the transmitter being disengaged from the cam 28, the magnet 37 will be energized, and the impeller 40 caused to advance from its normal position of rest, in a direction as shown by the associated arrow. Upon the follower 27 engaging the cam 28, the impulse will be interrupted, whereupon the magnet 37 will be de-energized, with the result that the impeller 41 will at once begin to rotate from its position of rest, in the direction shown by its associated arrow.

Thus, in accordance as the follower 27 is free of, or is in engagement with, the cam 28, the impellers 40 and 41 respectively will be caused to rotate in their respective senses, each, when released, resetting to its normal position of rest under the influence of springs (not shown in the drawings). The total time of each cycle of operation, as established by rotation of the cam 28, is thus divided into two intervals, during which the impellers 40 and 41 alternatively operate, the relative values of these intervals being governed by the deflected position of the arm 19 as established by the measured magnitude.

If the impulse causing the impeller 40 to deflect from its position of rest is of sufficient duration, the arm 44 will be engaged and carried along by the impeller, rotating the pinion 46, and thereby the gear 48, in a direction to advance the arm 50 toward the upper part of the chart scale 51. Upon termination of the impulse, the magnet 37 will be de-energized, whereupon the impeller 41 will at once begin its excursion from its position of rest (the impeller 40 meanwhile returning quickly to its stop); and, if the magnet remains de-energized for a sufficiently long time, the impeller 41 will engage the arm 45, and, acting through the pinion 47, will rotate the gear 48 in a sense to move the pointer arm 50 toward the lower end of the scale.

Since the pinions 46 and 47 are both permanently meshed with the gear 48, it will be apparent that upon the rotation of this gear by either pinion, the other pinion will rotate. Thus, the arms 44 and 45 have a definite relationship; and, as arm 44 is forced in an "up scale" direction by action of the impeller 40, the arm 45 will rotate in the same angular direction, tending to approach the impeller 41, and vice versa. The speeds of the transmitting and receiving units are so related that the sum of the time interval required for one impeller to make its excursion and the interval required for the other impeller to reach a point where it just engages its related arm in the position to which said arm was moved by action of the first-named impeller through the pinions and the gear, is exactly equal to the time of one revolution of the cam in the transmitting unit, i. e., to the sum of the "on" impulse and the "off" impulse. Thus, with the measured quantity having a constant value, and the pointer arm 19 in the transmitter remaining at rest, the alternate effects of the impellers 40 and 41 in the receiving instrument will be such as definitely to position the arm 50 on the scale 51, and thereby provide a measure of that quantity. Upon a change in the magnitude of the measured condition, the relative durations of the impulses will correspondingly change, and the arm 50 will take up a new position representative of the condition.

Practical operation of this type of telemetric apparatus has shown that the greatest precision of results will be obtained by providing a "dead" zone at the start of each impeller's path. This is made desirable primarily by the need of providing a definite "make" and "break" to define each impulse, even though the measuring pointer be at one end or the other of the scale. This prevents stalling of the mechanism, should either extreme of the normal excursion be reached.

Furthermore, as is pointed out in the above-mentioned patent to Bristol, the making of the impulse periods somewhat in excess of values exactly proportional to scale deflections renders possible the incorporation of a valuable feature whereby the deflection of the pointer in the receiving instrument above or below the normal limits of its scale becomes a positive indication of trouble in the interconnecting circuit. It has also been found that the properties of inertia may sometimes introduce errors unless a definite time is allowed for these effects to be absorbed when the impeller is not in actual engagement with the arm which is geared to the recording or indicating pointer.

Figure 3:
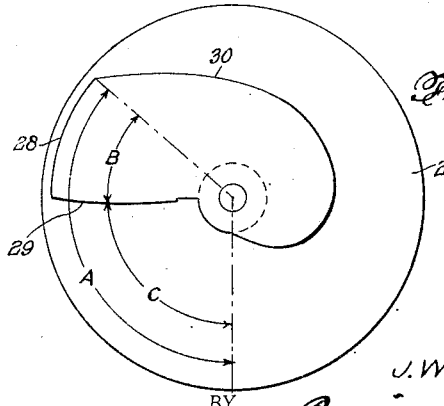
Fig. 3 shows in elevation a cam adapted for use as an element in the transmitting mechanism, and having a form to which the purposes of the invention are particularly suited.

The manner of providing this "idle zone" in operation will be understood by reference to Fig. 3, wherein is shown a typical cam such as might be used in a flow telemetering system. While not essential to the basic principle of this system of telemetering, it is customary to design the cam contour in such a manner that the durations of the successive impulses will bear a relationship proportional to the successive values of the measured quantity. Thus, the leading edge 29 of the cam 28 is formed so that the beginnings of successive impulses will always occur at the same instant in the cycle, the curvature shown being in the nature of an arc having a radius equal to that of the arm 19. Thus, whatever may be the excursion of the pointer-arm 19, the contacts will always be opened at the same time in the cycle. The time of closing of the contacts will be governed by the instant the follower drops off the spiral-trailing edge 30, so that the duration of each impulse in the cycle represented by a rotation of the cam will be equal to the time when contacts 33 and 34 are closed by the member 32, i. e., when the follower 27 is not in contact with the cam 28.

If the deflections of the arm 19 are directly proportional to the measured quantity, it follows that a cam having a trailing edge conformed to an arithmetical spiral (modified to the curvilinear path of the rider 27) will cause the impulses to be porportional to the measured magnitude. Where the device is used in conjunction with a measuring element in which the deflection of the spindle is related to the value of the measured magnitude by a definite but non-linear law, it is possible to incorporate that law in the contour of the trailing edge and produce a linear relationship between the value of the measured quantity and the durations of the impulses. Such a cam is represented in Fig. 3, where the contour 30 is designed to incorporate the square-root relationship which characterizes flow meters of the orifice type. The use of such a cam causes the impulses in the line to vary in duration as the flow in the pipe line.

If the impulses derived from the action of the arm 32 in response to the rider 27 engaging and disengaging the cam 28 were imparted directly to an integrating mechanism of the class above set forth, it would be possible to have the two extremities of the spiral contour 30 terminate on the radius represented by the contour 29, whereupon the impulses would follow one another in uninterrupted succession, and each instant of time in the cycle would have a significance in the ultimate measurement. Owing to mechanical characteristics of receiving units, as above set forth, it becomes desirable to provide an "idle zone" in each interval, during which certain elements of the receiving mechanism may adapt and adjust themselves to operating conditions and not become a source of error in the indicated or recorded values.

This "idle zone" is represented to an exaggerated scale in Fig. 3 by the angle A, which is the angle between the radii where the contour 30 intersects the upper and lower limits of the range of measurement as measured along the radius of the cam. Substantially midway within the sector represented by the angle A is located the leading contour 29, so that the angular space is divided into two sectors represented by the angles B and C, the former representing the interval between the instant contact is broken by the member 32 and the instant the outer end of the contour 30 swings into the field of possible engagement, and the latter representing the interval between the termination of the contour 30 on the inner limit of the measuring range and the time of engagement of the rider 27 by the contour 29.

Figs. 5 and 6 show an alternative construction of the transmitting mechanism, wherein the cam 28' has thereon a projection 28'', so positioned as to engage momentarily a dog 21'' on the anvil plate 21' and actuate it in a sense to open the contacts 33 and 34 at exactly the same point in each revolution, without respect to the position of the rider 27' in its path. This obviates the necessity of accurate arcuate conformation of the leading edge of the cam, and confines the duty of the rider 27' to maintaining the contact condition established by the dog 21'' and terminating said condition as it slips over the trailing edge of the cam.

With either of the cam designs as above set forth there are two distinct zones of action in the receiving instrument, between which discrimination must be made. One of these is the active zone, which is represented by the total excursion of either of the arms 44 or 45 through an angle corresponding to the complete scale of deflection of the pointer-arm 50. The other zone includes the "idle zone", and represents the active zone together with the angles through which the impellers 40 and 41 must pass between their normal positions of rest and their points of engagement with either of the arms 44 or 45 when that arm is at a position corresponding to one or the other end of the chart scale—arm 44 at the bottom, and arm 45 at the top, of the scale.

The device, as thus far described, does not differ materially from a standard form of telemetering system well known to those versed in the art, and for which no invention is here claimed.

The integrating mechanism, which may be either mechanically (as shown in Fig. 1) or electrically (as shown in Fig. 4) associated with the telemeter receiver, includes a counting train driven by a constant-speed motor, and actuated thereby for successive time intervals corresponding to the intervals established by the transmitting cam in its engagements with the primary measuring pointer.

As shown in Fig. 1, the integrating mechanism is mounted directly upon the frame of the receiving unit 35, and is driven by the same constant-speed motor 36. A shaft member 53 carries upon one extremity a fine-toothed gear member 54, and upon its other extremity a worm-wheel 55, meshing with a worm 56 continuously driven from the constant-speed motor 36 through a shaft member 57. Directly in alignment with the shaft 53 is a shaft 58 carrying on one end a gear member 59 in proximity to gear 54, of which it may be a duplicate. On the other extremity of shaft 58 is a counting train 60 of the conventional "cyclometer" type, by which there may be obtained a count or integration of the total number of revolutions made by the shaft 58.

Mounted upon the frame of the mechanism 35 is a magnet structure 61 comprising an iron yoke 62 and a hinged armature 63 subject to attraction by the yoke 62 when electric current is passed through a magnetizing winding 64. Journalled upon an extension of the armature 63 is an idler 65 having a toothed periphery and adapted to mesh simultaneously with the gears 54 and 59, whereby the latter will rotate together whenever the armature 63 approaches the yoke 62 of the magnet structure. The winding 64 is connected in circuit with the magnet 37, so that, were the armature 63 free at all times to act, the gearing would be thrown into mesh concurrently with energization of the magnet 37, and the integrating train 60 would advance at all times when an impulse is existent in the line, or at all times when the impeller 40 is being moved in an upscale sense.

The essential feature of the invention consists in providing means whereby the completing of the gear train which drives the integrator may be definitely delayed during the period when the impeller 40 is traversing the "idle zone", corresponding to the distance of its normal position of rest below the zero position of the arm 44, and to the angle C as indicated on the cam 28, as shown in Fig. 3. To this end there is attached to the impeller 40, and to be rotatable therewith, a plate or detent member 165, positioned to engage the extended armature 63 and normally prevent its approach to the yoke 62. The trailing edge of the plate 165, as the plate rotates with the impeller 40 in a sense indicated by the associated arrow in Fig. 1, is radially cut, and adjusted to release the armature 63 at the same instant as the impeller 40 reaches a position corresponding to that which would be occupied by the arm 44 were the recording arm 50 at the zero graduation of the chart scale. The angle through which the plate 165 travels between the instant of energization of the magnet 61 and the instant of release of the armature 63 corresponds to the angle C on cam 28, and represents the constant time interval added to the impulse between the instant of its inception and the instant when actual measurement begins. In order to eliminate possible confusion, it may here be observed that whereas, the constant excess time interval is added to the measuring interval at the beginning of the working interval in the receiving instrument, it is added at the end of the working interval in the transmitting instrument; but, so long as the totals retain their correct absolute and relative values, the sequence of measuring and idle intervals is of no consequence.

As the integrating mechanism is engaged only as the armature 63 is disengaged by the detent 165 integration begins at the instant in the cycle corresponding to actual measurement, or to deflection of the recording pointer across the record chart. As the magnets 37 and 61 are energized from a common circuit, they will be released simultaneously. Thus the whole time of integration is made to correspond to a time representing actual measurement, and the summation of a succession of these time intervals becomes a true integration of the measured quantity.

Since the impulses corresponding to operation of the impeller 41 are not utilized for purposes of integration, it is not necessary to provide any device to compensate for the excess of their time intervals over the actual measuring intervals. However, should occasion arise for utilizing these impulses in a similar manner to those of the impeller 41, it will be apparent to those versed in the art that the same may be done within the scope of this invention.

In Fig. 4 is shown diagrammatically a representation of an alternative form of integrator, in which the counting device is separate from the telemeter receiver and is actuated therefrom by electrically relayed impulses. The magnet 61' and plate or detent 65' are mounted on the receiving unit indicated at 35; but the armature 63' of the magnet 61', instead of directly actuating the gear-engaging elements, serves to control contacts 66 and 67, whereby current from a source 68 is caused to energize a further magnet 69. The source 68 may be common to that of the telemetering system, such as the battery 42 in Fig. 1, or it may be independent thereof.

In the same manner as the integrator set forth in Fig. 1, a constant-speed motor 70 drives a continuously running gear member 71, and a juxtaposed similar gear 72 is directly connected to a counting train 73. An idler 74, actuated by the armature of magnet 69, serves to engage the gears 71 and 72, whereby the counting train will perform an integration of the time intervals represented by the impulses in the circuit of the magnet 69. Since these impulses terminate concurrently with those in the telemetering circuit, but have their initiations delayed by a time interval governed by the width of the "idle zone", it is apparent that the summation of the impulses, as with the form of the device set forth in Fig. 1, will be a true integration of the values of the measured quantity.

While the invention has been specifically set forth in its application to the integration of fluid flow in an enclosed pipe line, it will be obvious to those versed in the art that its principles may be adapted without departing from the spirit of the invention to the integration of flow values determined in a flume, a weir, or any device whereby instantaneous values of flow are represented by variable magnitudes. Moreover, the invention is not in any sense limited to the integration of flow, but to the integration of any quantity which may be measured and caused to actuate a telemetering transmitter of the "impulse" class.

I claim:

1. Integrating mechanism for use with telemetering systems of the impulse class wherein transmitted impulses are not directly proportional to values of the telemetered magnitude and embodying a transmitter and a receiver apparatus, said mechanism comprising an intermittently actuated counting train, actuating means for the same including a continuously running power means, coupling means between said power means and said train to actuate the latter when an impulse is transmitted over the system, and means to inhibit temporarily the action of said coupling means over a predetermined period of said impulse.

2. Integrating mechanism for use with telemetering systems of the impulse class wherein transmitted impulses are not directly proportional to values of the telemetered magnitude and embodying a transmitter and a receiver apparatus, said mechanism comprising an intermittently actuated counting train, actuating means for the same including a continuously running power means and a gear wheel driven thereby, a second gear connected with the counting train, an elongated pinion adapted for engagement with both of the said gears, means responding concurrently with the receiver apparatus under a received impulse to rock the pinion into engaging position, and means to block temporarily the rocking of said pinion over a predetermined period of said impulse.

3. Integrating mechanism for use with telemetering systems of the impulse class wherein transmitted impulses are not directly proportional to values of the telemetered magnitude and embodying a transmitter and a receiver apparatus, said mechanism comprising an intermittently actuated counting train, actuating means for the same including a continuously running power means, electro-mechanical coupling means responding concurrently with the receiver apparatus under a received impulse and located between said power means and said train to actuate the latter, and means to inhibit temporarily the action of said coupling means over a predetermined period of said impulse.

4. Integrating mechanism for use with telemetering systems of the impulse class wherein transmitted impulses are not directly proportional to values of the telemetered magnitude and embodying a transmitter and a receiver apparatus, said mechanism comprising an intermittently actuated counting train, actuating means for the same including a continuously running power means, an electromagnet responding concurrently with the receiver apparatus under a received impulse, an armature rocked by said magnet, a coupling element carried by the armature for engaging the train with said power means, and means controlled by the receiver apparatus to block temporarily the rocking of said armature over a predetermined period of said impulse.

5. Integrating mechanism for use with telemetering systems of the impulse class wherein transmitted impulses are not directly proportional to values of the telemetered magnitude and embodying a transmitter and a receiver apparatus, said mechanism comprising an intermittently actuated counting train, actuating means for the same including a continuously running power means, an electromagnet responding concurrently with the receiver apparatus under a received impulse, an armature rocked by said magnet, an electric circuit controlled by said armature, coupling means between said power means and said train, means included in said electric circuit for bringing the coupling means into engagement with said power means and said train, and means controlled by the receiver apparatus to block temporarily the action of said electric circuit over a predetermined period of said impulse.

6. Integrating mechanism for use with telemetering systems of the impulse class wherein transmitted impulses are not directly proportional to values of the telemetered magnitude and embodying a transmitter and a receiver apparatus, the latter including a pair of angularly movable impeller elements for positioning alternatively an indicating element of the receiver apparatus, said integrating mechanism comprising an intermittently actuated counting train, actuating means for the same including a continuously running power means, coupling means between said power means and said train to actuate the latter when an impulse is transmitted over the system, and means movable with one of the impeller elements to inhibit temporarily the action of said coupling means over a predetermined period of said impulse.

7. Integrating mechanism for use with telemetering systems of the impulse class wherein transmitted impulses are not directly proportional to values of the telemetered magnitude and embodying a transmitter and a receiver apparatus, the latter including a pair of angularly movable impeller elements for positioning alternatively an indicating element of the receiving apparatus, said integrating mechanism comprising an intermittently actuated counting train, actuating means for the same including a continuously running power means, an electromagnet responding concurrently with the receiver apparatus under a received impulse, an armature rocked by said magnet, coupling means controlled by said armature and located between said power means and said train to actuate the latter when an impulse is transmitted over the system, and a member movable with one of the impeller elements to engage the armature and block temporarily the rocking thereof over a predetermined period of said impulse.

J. WINFRED BEECHER.